US012633185B2

(12) United States Patent
Saqr

(10) Patent No.: US 12,633,185 B2
(45) Date of Patent: May 19, 2026

(54) BUILDING ACCESS CONTROL USING A MOBILE DEVICE

(71) Applicant: Honeywell International Inc., Charlotte, NC (US)

(72) Inventor: Mohammed Farooq Abdalfattah Saqr, Riyadh (SA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 16 days.

(21) Appl. No.: 18/658,813

(22) Filed: May 8, 2024

(65) Prior Publication Data

US 2025/0349168 A1 Nov. 13, 2025

(51) Int. Cl.
*G07C 9/27* (2020.01)
*G07C 9/00* (2020.01)

(52) U.S. Cl.
CPC ........... *G07C 9/27* (2020.01); *G07C 9/00309* (2013.01); *G07C 9/00571* (2013.01)

(58) Field of Classification Search
CPC ... G07C 9/27; G07C 9/00309; G07C 9/00571
See application file for complete search history.

(56) References Cited

U.S. PATENT DOCUMENTS

| | | | |
|---|---|---|---|
| 4,672,654 | A | 6/1987 | Vanacore |
| 5,640,139 | A | 6/1997 | Egeberg |
| 6,384,709 | B2 | 5/2002 | Mellen et al. |
| 6,989,732 | B2 | 1/2006 | Fisher |
| 7,009,489 | B2 | 3/2006 | Fisher |
| 7,012,503 | B2 | 3/2006 | Nielsen |
| 7,734,068 | B2 | 6/2010 | Fisher |
| 7,903,846 | B2 | 3/2011 | Fisher |
| 7,969,302 | B2 | 6/2011 | Srinivasa et al. |
| 8,164,419 | B2 | 4/2012 | Fisher |
| 8,232,879 | B2 | 7/2012 | Davis |

(Continued)

FOREIGN PATENT DOCUMENTS

| | | | |
|---|---|---|---|
| AU | 2014236999 | A1 | 10/2015 |
| CA | 2640261 | A1 | 8/2007 |

(Continued)

OTHER PUBLICATIONS

US 10,148,670 B2, 12/2018, Markel et al. (withdrawn)

(Continued)

*Primary Examiner* — Nabil H Syed
(74) *Attorney, Agent, or Firm* — Seager, Tufte & Wickhem, LLP

(57) ABSTRACT

A system includes a door lock module for locking and unlocking a door and a mobile device running an access control application that is configured to receive access rights from a server and store the access rights in the mobile device. The access control application identifies a door ID of the door to the secure area and determines whether the access rights stored in the mobile device grant the user assigned to the mobile device access to the secure area of the facility. If so, the access control application sends a door access request to the door lock module to unlock the door, and if not, no door access request is sent. The access control application is configured to send a log entry corresponding to each door access request initiated by the mobile device to the server.

17 Claims, 6 Drawing Sheets

(56) References Cited

U.S. PATENT DOCUMENTS 8,427,320 B2 4/2013 Davis
8,451,088 B2 5/2013 Fisher
8,560,839 B2 10/2013 Barham et al.
8,593,249 B2 11/2013 Bliding et al.
8,643,475 B1 2/2014 Kohno et al.
8,693,249 B2 4/2014 Yano et al.
8,768,306 B1 7/2014 Ben Ayed
8,792,936 B2 7/2014 Rajendran et al.
8,793,776 B1 7/2014 Jackson
8,839,361 B2 9/2014 R
8,912,884 B2 12/2014 Fisher
8,943,187 B1 1/2015 Saylor
9,053,629 B2 6/2015 Fisher et al.
9,058,702 B2 6/2015 Chao et al.
9,076,273 B2 7/2015 Smith et al.
9,098,688 B1 8/2015 Jackson
9,118,656 B2 8/2015 Ting et al.
9,292,985 B2 3/2016 Ahearn et al.
9,305,298 B2 4/2016 Wilson
9,322,194 B2 4/2016 Cheng et al.
9,322,201 B1 4/2016 Cheng et al.
9,367,676 B2 6/2016 Wilson
9,382,739 B1 7/2016 Johnson et al.
9,396,320 B2 7/2016 Lindemann
9,444,805 B1 9/2016 Saylor et al.
9,470,017 B1 10/2016 Cheng et al.
9,470,018 B1 10/2016 Cheng et al.
9,472,034 B2 10/2016 Ahearn et al.
9,508,206 B2 11/2016 Ahearn et al.
9,514,469 B2 12/2016 Fuchs et al.
9,530,295 B2 12/2016 Johnson
9,589,403 B2 3/2017 Lingan et al.
9,600,949 B2 3/2017 Conrad et al.
9,704,315 B2 7/2017 Fisher et al.
9,713,002 B2 7/2017 Roy et al.
RE46,539 E 9/2017 Fisher
9,767,632 B2 9/2017 Johnson
9,830,760 B2 11/2017 Fisher
9,887,983 B2 2/2018 Lindemann et al.
10,068,399 B2 9/2018 Fisher et al.
10,096,182 B2 10/2018 Prasad et al.
10,176,310 B2 1/2019 Baghdasaryan
10,182,309 B2 1/2019 Mahasenan et al.
10,186,098 B2 1/2019 Lingan et al.
10,186,099 B2 1/2019 Ahearn et al.
10,198,884 B2 2/2019 Johnson
10,255,732 B2 4/2019 Prasad et al.
10,268,811 B2 4/2019 Baghdasaryan
10,270,748 B2 4/2019 Briceno et al.
10,304,273 B2 5/2019 Johnson et al.
10,366,218 B2 7/2019 Blanke
10,395,452 B2 8/2019 Morrison et al.
10,878,650 B1 12/2020 Meruva et al.
11,080,953 B2 8/2021 Kim et al.
11,348,391 B2 5/2022 Fisher et al.
11,348,396 B2 5/2022 Meruva et al.
11,363,459 B2 6/2022 Pazhyannur et al.
2003/0179073 A1 9/2003 Ghazarian
2005/0071673 A1 3/2005 Saito
2005/0242957 A1 11/2005 Lindsay et al.
2007/0025314 A1 2/2007 Gerstenkorn
2007/0186106 A1 8/2007 Ting et al.
2007/0205861 A1 9/2007 Nair et al.
2007/0296545 A1* 12/2007 Clare ................. G07C 9/00571 340/5.64
2009/0249433 A1 10/2009 Misra et al.
2010/0052931 A1 3/2010 Kolpasky et al.
2010/0102993 A1 4/2010 Johnson
2010/0201536 A1 8/2010 Robertson et al.
2010/0297941 A1 11/2010 Doan et al.
2010/0315197 A1* 12/2010 Solomon ................. G06F 21/31 340/5.2
2011/0001603 A1 1/2011 Willis
2011/0291798 A1 12/2011 Schibuk
2012/0092127 A1 4/2012 Ganapathi et al.
2012/0154115 A1 6/2012 Herrala
2012/0159156 A1 6/2012 Barham et al.
2012/0169461 A1 7/2012 Dubois, Jr.
2012/0230489 A1 9/2012 Cho
2012/0234058 A1 9/2012 Neil et al.
2012/0311642 A1 12/2012 Ginn et al.
2013/0021145 A1 1/2013 Boudy
2013/0176107 A1 7/2013 Dumas et al.
2013/0214898 A1 8/2013 Pineau et al.
2013/0221094 A1 8/2013 Smith et al.
2013/0247117 A1 9/2013 Yamada et al.
2013/0257589 A1 10/2013 Mohiuddin et al.
2013/0268998 A1 10/2013 Ko et al.
2013/0311373 A1 11/2013 Han et al.
2013/0314210 A1 11/2013 Schoner et al.
2013/0332367 A1 12/2013 Quigley et al.
2014/0002236 A1 1/2014 Pineau et al.
2014/0049361 A1 2/2014 Ahearn et al.
2014/0051407 A1 2/2014 Ahearn et al.
2014/0084059 A1 3/2014 Sierchio et al.
2014/0089178 A1 3/2014 Lee et al.
2014/0109175 A1 4/2014 Barton et al.
2014/0159660 A1 6/2014 Klose et al.
2014/0189880 A1 7/2014 Funk et al.
2014/0219431 A1 8/2014 Wagner et al.
2014/0240087 A1 8/2014 Liu et al.
2014/0267739 A1 9/2014 Ibsies et al.
2014/0277935 A1 9/2014 Daman et al.
2014/0289116 A1 9/2014 Polivanyi
2014/0289117 A1 9/2014 Baghdasaryan
2014/0289790 A1 9/2014 Wilson
2014/0289820 A1 9/2014 Lindemann et al.
2014/0289833 A1 9/2014 Briceno et al.
2014/0342667 A1 11/2014 Aarnio
2014/0375421 A1 12/2014 Morrison et al.
2014/0380444 A1 12/2014 Kelley
2015/0004937 A1 1/2015 Kremen et al.
2015/0035987 A1 2/2015 Fernandez
2015/0048927 A1 2/2015 Simmons
2015/0095218 A1* 4/2015 Wild ......................... B60L 3/12 705/39
2015/0194000 A1 7/2015 Schoenfelder et al.
2015/0227923 A1 8/2015 Kutsch et al.
2015/0227969 A1 8/2015 Hanly
2015/0256973 A1 9/2015 Raounak
2015/0279132 A1 10/2015 Perotti
2016/0035159 A1 2/2016 Ganapathy Achari et al.
2016/0049025 A1 2/2016 Johnson
2016/0055692 A1 2/2016 Trani
2016/0055698 A1 2/2016 Gudmunsson et al.
2016/0080390 A1 3/2016 Kalb et al.
2016/0155281 A1 6/2016 O'Toole
2016/0189454 A1 6/2016 Johnson et al.
2016/0319571 A1 11/2016 Johnson
2016/0335819 A1 11/2016 Lingan et al.
2016/0337508 A1 11/2016 Roy et al.
2017/0018130 A1 1/2017 Robinson
2017/0076523 A1 3/2017 Rumble et al.
2017/0127372 A1 5/2017 Patel et al.
2017/0270732 A1 9/2017 Troesch et al.
2017/0280322 A1 9/2017 Roy et al.
2017/0289753 A1 10/2017 Mahasenan et al.
2018/0047233 A1 2/2018 Fisher
2018/0068503 A1 3/2018 Prasad et al.
2018/0068507 A1 3/2018 Prasad et al.
2018/0144568 A1 5/2018 Lingan et al.
2018/0234410 A1 8/2018 Lindemann et al.
2018/0247038 A1 8/2018 Lindemann
2018/0268675 A1 9/2018 Johnson et al.
2019/0019364 A9 1/2019 Cheng et al.
2019/0051068 A1 2/2019 Prasad et al.
2019/0104133 A1 4/2019 Markel et al.
2019/0108703 A1 4/2019 Meganck et al.
2019/0130686 A1 5/2019 Cheng et al.
2019/0130687 A1 5/2019 Johnson
2019/0206160 A1 7/2019 Daniel-Wayman et al.
2019/0253404 A1 8/2019 Briceno et al.
2019/0371096 A1 12/2019 Fisher
2020/0098216 A1 3/2020 Kuster et al.

(56) References Cited

U.S. PATENT DOCUMENTS

| | | | | |
|---|---|---|---|---|
| 2020/0320808 | A1 | 10/2020 | Valder et al. | |
| 2020/0351661 | A1 | 11/2020 | Kuenzi et al. | |
| 2020/0394856 | A1* | 12/2020 | Meruva | G07C 9/00904 |
| 2020/0394861 | A1 | 12/2020 | Meruva et al. | |
| 2020/0413216 | A1* | 12/2020 | Robertson | G07C 9/00309 |
| 2021/0153015 | A1 | 5/2021 | Roy et al. | |
| 2021/0170991 | A1* | 6/2021 | Parthasarathi | H04W 4/48 |
| 2022/0270424 | A1 | 8/2022 | Meruva et al. | |
| 2022/0277605 | A1 | 9/2022 | Coniff et al. | |
| 2022/0377555 | A1 | 11/2022 | Pirch et al. | |
| 2022/0384949 | A1 | 12/2022 | Pirch | |
| 2023/0015030 | A1* | 1/2023 | Chandran | H04L 63/20 |
| 2024/0144754 | A1* | 5/2024 | Debord | G07C 9/00571 |

FOREIGN PATENT DOCUMENTS

| | | | |
|---|---|---|---|
| CA | 2654838 | A1 | 8/2009 |
| CA | 2840665 | A1 | 8/2014 |
| CA | 2905009 | A1 | 9/2014 |
| CH | 699096 | A2 | 1/2010 |
| CN | 102609662 | B | 7/2012 |
| CN | 104200555 | A1 | 2/2014 |
| CN | 104008583 | A | 8/2014 |
| CN | 104144497 | A | 11/2014 |
| CN | 105574960 | A | 5/2016 |
| CN | 106204817 | A | 12/2016 |
| CN | 206557866 | U | 10/2017 |
| CN | 107564143 | A | 1/2018 |
| CN | 103685218 | B | 9/2018 |
| CN | 103971039 | B | 3/2020 |
| CN | 105229596 | B | 4/2020 |
| CN | 112211502 | A | 1/2021 |
| CN | 117292467 | A | 12/2023 |
| DE | 102014106364 | A1 | 11/2014 |
| DE | 102014119003 | A1 | 6/2016 |
| EP | 0265270 | A2 | 4/1988 |
| EP | 1982288 | A2 | 10/2008 |
| EP | 2085934 | A1 | 8/2009 |
| EP | 2106106 | A1 | 9/2009 |
| EP | 2192560 | A1 | 6/2010 |
| EP | 2709334 | A2 | 3/2014 |
| EP | 2763106 | A2 | 8/2014 |
| EP | 2976706 | A2 | 1/2016 |
| EP | 3048587 | A1 | 7/2016 |
| ES | 2700361 | T3 | 2/2019 |
| IN | 2014CH00324 | A | 4/2015 |
| JP | 2014503909 | A | 2/2014 |
| JP | 6433978 | B2 | 12/2018 |
| JP | 2019061688 | A | 4/2019 |
| KR | 20060011267 | A | 2/2006 |
| KR | 101889577 | B1 | 8/2018 |
| KR | 101959270 | B1 | 3/2019 |
| TW | I513266 | B | 12/2015 |
| WO | 2006136662 | A1 | 12/2006 |
| WO | 2007089503 | A2 | 8/2007 |
| WO | 2010003898 | A1 | 1/2010 |
| WO | 201287853 | A2 | 6/2012 |
| WO | 2014031399 | A1 | 2/2014 |
| WO | 2014151692 | A2 | 9/2014 |
| WO | 2014153462 | A2 | 9/2014 |
| WO | 2019245383 | A1 | 12/2019 |

OTHER PUBLICATIONS

Mobile Credential End-User Flyer, 3x Logic, Westminster, CO, 2 pages, 2018.

Cappos et al; "BlurSense: Dynamic Fine-Grained Access Control for Smart Phone Privacy," 2014 IEEE Sensors Applications Symposium (SAS), 4 pages, 2014.

Kupper et al; "TraX: A Device-Centric Middleware Framework for Location Based Services," IEEE Communications Magazine, pp. 114-120, Sep. 2006.

Liu et al; "Double-Windows-Based Motion Recognition in Multi-Floor Buildings Assisted by a Built-in Barometer," Sensors, 2018, 18, 1061, pp. 1-23, Mar. 2018.

Location Based Tracker-Future Lab-ASSA ABLOY-Studying Security Trends. 2 pages, https: //futurelab.assaabloy.com/en/location-based-tracker/ accessed Mar. 1, 2021.

Shuster et al; "Situational Access Control in the Internet of Things," In 2018 SIGSAC Conference on Computer Communication Security (CCS' 18), Toronto, Ontario, Canada, 18 pages, Oct. 15-19, 2018.

Smart Keys, Locks and Door Openers as Part of Intelligent Access Control Systems, Conrad Connect, 2021. https://conradconnect.com/en/blog/smart-keys-locks-and-door-openers-part-intelligent-access-control-systems 16 pages, accessed Mar. 1, 2021.

Tarameshloo et al; "Access Control Models for Geo-Social Computing Systems," SACMAT' 14, London, Ontario, Canada, 12 pages, Jun. 25-27, 2014.

Zhang et al; "Location-Based Authentication and Authorization using Smart Phones," 2012 IEEE 11th International Conference on Trust, Security and Privacy in Computing and Communications, 8 pages, 2012.

Extended European Search Report, European Patent Office, EP Application No. 22156072.5, dated Jul. 21, 2022 (10 pages).

https://www.merriam-webster.com/dictionary/track 2 pages, accessed Apr. 7, 2017.

https://youtube/D1L3o88GKew, Lockitron—Keyless Entry Using Your Phone, Lockitron, 3 pages, Oct. 2, 2012. Accessed Mar. 19, 2018.

International Search Report for Corresponding Application No. EP14173062 dated Dec. 5, 2014.

MicroStrategy, "Secure Business Intelligence on Apple® Mobile Devices," Microstrategy Incorporated, 20 pages, COLL-09670511, 2011.

Khan et al., "Location Awareness in 5G Networks using RSS Measurements for Public Safety Applications," IEEE Access, vol. 5, pp. 21753-21762, 2017.

Qiu, "Study on Security and Privacy in 5G-Enabled Applications," Wireless Communications and Mobile Computing, vol. 2020, 15 pages, 2020.

Usher, "Safe and Secure Mobile Identity Network," Micro-Strategy Incorporated, 2 pages, COLL-1085 1012, 2013.

Wikipedia, International Mobile Equipment Identity, 7 pages, Accessed Aug. 24, 2023.

Fave et al., "Game-theoretic Security Patrolling with Dynamic Execution Uncertainty and a Case Study on a Real Transit System," Journal of Artificial Intelligence Research vol. 50, pp. 321-367, Jun. 2014.

"Logosoft brings lone worker supervision into the Android era," http://www.securitynewsdesk.com/lo go soft-brings-lone-worke••supervision-android-era/, 7 pages, May 29, 2014.

Sookman, "Smartphones are Key to the Future of Security," https://www.guardly.com/blog /2015 /0 2/04/smartphones-are-key-to-the•future-of-security/index.html, 5 pages, Feb. 4, 2015.

Bobescu et al., "Mobile indoor positioning using wi-fi localization," Review of the Air Force Academy, No. 1 (28), 4 pages, 2015.

Bhargava et al., "Physical Authentication through Localization in Wireless Local Area Networks," Global Telecommunications Co••ference, GLOBECOM '05 IEEE, 5 pages Jan. 23, 2006.

"Passive Entry Door System with Proximity Sensor," http://www.atmel.corn/Images/ Atmel-425 82-Passive-Entry-Door-System-with•Proximity-Sensor_Application%20N ote _AT 12649. pdf, 22 pages, Nov. 2015.

Bellido-Outeirno, "Universal Bluetooth Access Control and Sec••rity System," International Journal on Advances in Security, vol. 4 No. 3 and 4, 10 pages, 2011.

"Mobile Access Control: the Ultimate Guide," KISI, 10 pages, accessed Jun. 17, 2019.

Woolaston, "The end of the house key? Mobile app lets you open your front door using your Phone (and you don't even need to take it out of your pocket)", http.//www.dailymail.co.uk/sciencetech/article-2384817/Kwikset-Kevo-mobile-app-lets-open-door-using-PHONE.html; Aug. 5, 3 pages, 2013.

Sesame Smart Lock, "Your Key Reinvented," http://www.candyhouse.co/. 8 pages, Accessed Oct. 21, 2015.

(56) References Cited

OTHER PUBLICATIONS

Usher Mobile Identity Platform. MicroStrategy. 24 pages. https://www.microstrategy.com/Strategy/media/downloads/products/usher_overview-presentation.pdfpresentation.pdf. Accessed Feb. 5, 2015.
Sentrilock Sentrikey® Iphone Mobile App Guide, 2024. https://www.sentrilock.com/sentrikey-real-estate-ios-mobile-app/.
Sentrilock, Let's Unlock the Possibilities, Electronic Lockboxes Sales Brochure, 2024. https://www.sentrilock.com/.
Sentrilock Sues Competitor, Alleging Patent Infringement, National Association of Realtors® 3 pages, Feb. 16, 2022. Accessed Mar. 14, 2024.
Sentrilock, Your Secure Lockbox Solution, The Secure, Safe and Easy-to-Use Lockbox, 1 page, May 2019.
Akuvox-X915S IP Touchscreen Smart Door Intercom Unit with Face Recognition, QR, RFID, BLE Product Datasheet, 4 pages. 2024. Accessed Jan. 16, 2024.
Bluetooth Unlock with Verkada Access Control, Verkada Help Center, 11 pages, 2024. Accessed Jan. 16, 2024.
Product Datasheet, Verkada Bluetooth Unlock with Verkada Access Control, 4 pages, 2024.
CIE-Group, Access Control and Audio Visual Technology Suppliers, 4 pages, 2024. Accessed Jan. 15, 2024.
Nordson Products, QR Code and Bluetooth Access Control System, 4 pages, 2021. Accessed Jan. 15, 2024.
Shenzhen Rakinda Technologies Co. Ltd., RD009 4G Network Access Control Machine, 8 pages, 2024. Accessed Jan. 15, 2024.
SMARTair® TS1000 Web, Management Software, 1 page, 2024.
Kisi, Using QR Codes in Access Control Guide, 13 pages, 2024. Accessed Jan. 15, 2024.
Curling, "What is Quick Access and how to set it up," Klevio Support, 5 pages, 2024. Accessed Jan. 15, 2024.
Wavekey Mobile Phone Access Control made Reliable, Product Datasheet, 2 pages, 2024.
Wavekey, Mobile Access Control made Reliable, 2N, 19 pages, 2023. Accessed Jan. 16, 2024.
Extended European Search Report, European Patent Office, EP Application No. 14173062.2, dated Dec. 5, 2014 (3 pages).
Usher Product Sheet, 2 pages, MicroStrategy Inc., 2013.
Extended European Search Report, EP Application No. 25170473.0, European Patent Office, Sep. 8, 2025 (12 pgs).

* cited by examiner

BUILDING ACCESS CONTROL USING A MOBILE DEVICE

TECHNICAL FIELD

The present disclosure pertains generally to methods of gaining access to a secure area and more particularly to methods of using mobile devices in gaining access to a secure area.

BACKGROUND

Access control systems are commonly used to track and restrict movement of people within a facility. Some areas of a facility may be accessible to all or nearly all people within the facility. A cafeteria may be an example of an area that all or nearly all people within the facility may have access rights to. Some areas of a facility may only be accessible to a small subset of people, with other people not having access rights to those areas. A computer server room may be an example of an area having restricted access. Some access control systems rely on access card readers and access cards to identify people and determine who has access. Some access control systems rely on video cameras and video processing to identify people and determine who has access rights to a particular area. Each of these access control systems can require substantial hardware. What would be desirable are systems and methods for providing access control without requiring all of the hardware of a traditional access control system. What would be desirable are systems and methods in which a person's mobile device acts as a virtual controller in granting or denying access to a secure area.

SUMMARY

The present disclosure relates generally to access control systems, and more particularly to using a mobile device running an access control application to gain access to a secure area of a facility. An example may be found in a system for controlling access to a secure area of a facility. The illustrative system includes a door lock module for locking and unlocking a door to the secure area of the facility, the door lock module including a wireless communication module that support a first wireless communication protocol (e.g. WIFI) and a second wireless communication protocol (e.g. Bluetooth). A mobile device includes a wireless communication module that support the first wireless communication protocol and the second wireless communication protocol and runs an access control application. The illustrative system also includes a wireless gateway that is situated in the facility and includes a wireless communication module that supports the first wireless communication protocol. The wireless gateway is configured to independently communicate with the door lock module and the mobile device via the first wireless communication protocol. The wireless gateway is operatively coupled to a server. The access control application of the mobile device is configured to receive access rights from the server via the first wireless communication protocol of the wireless communication module of the wireless gateway, and store the access rights in a memory of the mobile device. The access rights define whether a particular user assigned to the mobile device has access rights to open the door and access the secure area of the facility. The access control application of the mobile device is configured to identify a door ID of the door to the secure area, and determine whether the access rights stored in the memory of the mobile device grant the particular user assigned to the mobile device access to the secure area of the facility, and if so, send via the second wireless communication protocol a door access request to the door lock module to unlock the door to the secure area of the facility, and if not, not send via the second wireless communication protocol the door access request to the door lock module to unlock the door to the secure area of the facility. The access control application of the mobile device is configured to send a log entry corresponding to each door access request initiated by the mobile device to the server via the first wireless communication protocol of the wireless communication module of the wireless gateway.

Another example may be found in a system for controlling access to a secure area of a facility. The illustrative system includes a door lock module for locking and unlocking a door to the secure area of the facility, the door lock module including a wireless communication module that support a first wireless communication protocol (e.g. WIFI) and a second wireless communication protocol (e.g. Bluetooth). A mobile device includes a wireless communication module that support the first wireless communication protocol and the second wireless communication protocol and runs an access control application. The illustrative system also includes a wireless gateway that is situated in the facility and includes a wireless communication module that supports the first wireless communication protocol. The wireless gateway is configured to independently communicate with the door lock module and the mobile device via the first wireless communication protocol. The wireless gateway is operatively coupled to a server. The access control application of the mobile device is configured to receive access rights from the server via the first wireless communication protocol of the wireless communication module of the wireless gateway, and store the access rights in a memory of the mobile device. The access rights define whether a particular user assigned to the mobile device has access rights to open the door and access the secure area of the facility. The access control application of the mobile device is configured to identify a door ID of the door to the secure area. The access control application of the mobile device is configured to determine whether the mobile device can successfully communicate with the server via the wireless gateway.

When the mobile device can successfully communicate with the server via the wireless gateway, the access control application of the mobile device is configured to determine whether the access rights stored in the memory of the mobile device grant the particular user assigned to the mobile device access to the secure area of the facility, and if so, send via the first wireless communication protocol a door access request to the door lock module via the wireless gateway (and sometimes the server) to unlock the door to the secure area of the facility, and if not, not send via the first wireless communication protocol the door access request to the door lock module via the wireless gateway (and sometimes the server) to unlock the door to the secure area of the facility. When the mobile device cannot successfully communicate with the server via the wireless gateway, the access control application of the mobile device is configured to determine whether the access rights stored in the memory of the mobile device grant the particular user assigned to the mobile device access to the secure area of the facility, and if so, send via the second wireless communication protocol a door access request to the door lock module to unlock the door to the secure area of the facility, and if not, not send via the second wireless communication protocol the door access request to the door lock module to unlock the door to the secure area of the facility.

The access control application of the mobile device may buffer log entries corresponding to each door access request initiated by the mobile device when the access control application of the mobile device cannot successfully send log entries to the server via the wireless gateway, and then subsequently upload the buffered log entries to the server when the access control application of the mobile device can again successfully send log entries to the server via the wireless gateway.

Another example may be found in a method for controlling access to a secure area of a facility. The illustrative method includes a mobile device receiving access rights from a server via a first wireless communication protocol of a wireless gateway that is operatively coupled to the server, the access rights defining whether a particular user assigned to the mobile device has access rights to open a door to access the secure area of the facility. The mobile device identifies a door ID of the door to the secure area, and determines whether the access rights received via the first wireless communication protocol grant the particular user assigned to the mobile device access to the secure area of the facility, and if so, the mobile device sending via a second wireless communication protocol that is different from the first wireless communication protocol a door access request to a door lock module associated with the door to unlock the door to the secure area of the facility, and if not, the mobile device not sending via the second wireless communication protocol the door access request to the door lock module to unlock the door to the secure area of the facility.

In some cases, the server may initiate the opening of the door by sending a door access request to the wireless gateway, which then transmits the door access request of the server to the door lock module via the first wireless communication protocol of the wireless gateway. In some cases, the server may initiate the opening of the door based on a request from an operator at an operator console that is operatively connected to the server, and/or based on a request by the mobile device that is transmitted to the wireless gateway via the first wireless communication protocol, which forwards the request to the server. In some cases, the server may determine whether the access rights grant the particular user that is assigned to the mobile device access to the secure area of the facility (rather than having the mobile device make this determination) before initiating the opening of the door.

Another example may be found in a non-transitory computer readable medium storing instructions thereof that when executed by one or more processors of a mobile device causes the one or more processors of the mobile device to receive access rights from a server via a first wireless communication protocol of a wireless gateway that is operatively coupled to the server, the access rights defining whether a particular user assigned to the mobile device has access rights to open a door to access the secure area of the facility. The one or more processors are caused to identify a door ID of the door to the secure area, and determine whether the access rights received via the first wireless communication protocol grant the particular user assigned to the mobile device access to the secure area of the facility, and if so, send via a second wireless communication protocol that is different from the first wireless communication protocol a door access request to a door lock module associated with the door to unlock the door to the secure area of the facility, and if not, not send via the second wireless communication protocol the door access request to the door lock module to unlock the door to the secure area of the facility.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
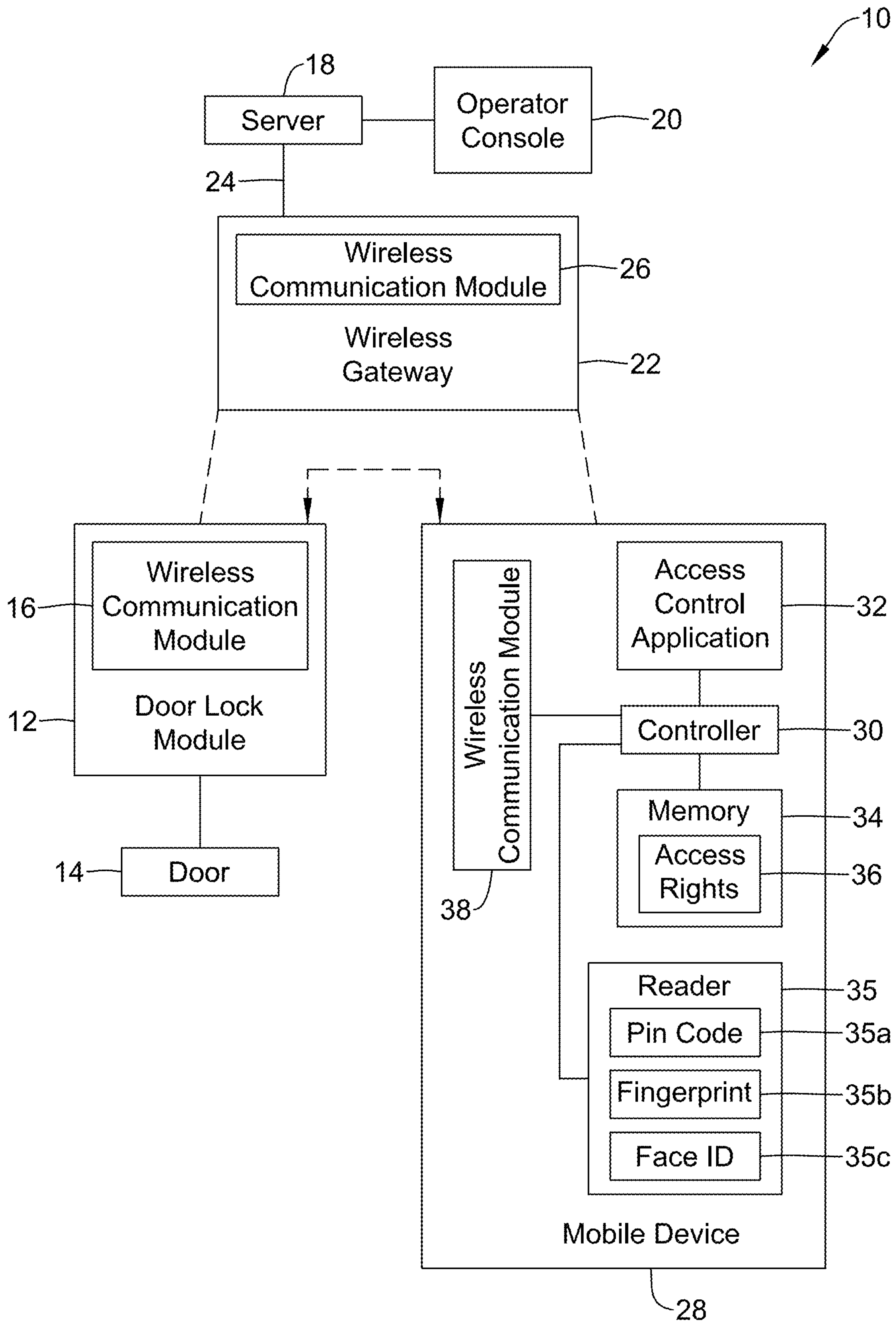
FIG. 1 is a schematic block diagram showing an illustrative system for controlling access to a secure area within a facility.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term “about”, unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms “a”, “an”, and “the” include the plural referents unless the content clearly dictates otherwise. As used in this specification and the appended claims, the term “or” is generally employed in its sense including “and/or” unless the content clearly dictates otherwise.

It is noted that references in the specification to “an embodiment”, “some embodiments”, “other embodiments”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10 for controlling access to a secure area of a facility. The illustrative system 10 includes a door lock module 12 that is configured to lock and unlock a door 14 that leads to a secure area of the facility. In some cases, the door lock module 12 may include a wireless communication module 16 that supports a first wireless communication protocol and a second wireless communication protocol. As an example, the first wireless communication protocol may be one of WIFI, Bluetooth and Zigbee, and the second wireless communication protocol may be a different one of WIFI, Bluetooth and Zigbee. As another example, the first wireless communication protocol may be WIFI, and the second wireless communication protocol may be Bluetooth. These are just examples.

The system 10 includes a server 18. In some cases, an operator console 20 may be operably coupled with the server 18 and may allow an operator to view information provided by the server 18 as well as to provide information to the server 18, including making door opening requests. In some cases, the server 18 may be a cloud-based server. In some cases, the server 18 may be a desktop computer. A wireless gateway 22 may be situated in the facility (i.e., at the edge) and may be operatively coupled to the server 18 via a network 24. As an example, the network 24 may include the Internet. The wireless gateway 22 includes a wireless communication module 26 that supports the first wireless communication protocol (e.g. WIFI).

The illustrative system 10 includes a mobile device 28. In some cases, the mobile device 28 may be a tablet, a phablet, laptop, a smart watch or a smart phone, for example. The mobile device 28 includes a controller 30 that may be considered as including one or more processors. The controller 30 executes an access control application 32. In some cases, an Operating System (OS) of the controller may support the access control application 32. The controller 30 may be operably coupled with a memory 34 that stores, among other things, access rights 36 that define whether a particular user that is assigned to the mobile device 28 has access to one or more secure areas of a facility. The mobile device 28 includes a wireless communication module 38 that supports both the first wireless communication protocol (e.g. WIFI) and the second wireless communication protocol (e.g. Bluetooth). In some cases, the wireless gateway 22 may be configured to independently communicate with the door lock module 12 and the mobile device 28 via the first wireless communication protocol, sometimes via independent communication channels.

In response to receiving a door access request, the server 18 may be configured to send an unlock command to the door lock module 12 of the door 14 via the first wireless communication protocol of the wireless communication module 26 of the wireless gateway 22 to unlock the door 14 to the secure area of the facility. In some cases, the server 18 may be configured to receive the door access request to unlock the door 14 from the wireless gateway 22, which receives the door access request from the mobile device 28 via the first wireless communication protocol of the wireless communication module 26 of the wireless gateway 22. In some cases, the server 18 may determine whether the access rights grant the particular user that is assigned to the mobile device access to the secure area of the facility (rather than having the mobile device make this determination). In some cases, the server 18 may be configured to receive the door access request to unlock the door 14 from the operator console 20 that is operatively coupled to the server 18.

In some cases, the mobile device 28 may include a reader 35 that may be used by the access control application 32 in identifying a user of the mobile device 28 in order to determine whether that user has access rights to gain access to a particular space within the facility. The reader 35 may include a PIN code 35*a*. The reader 35 may include a fingerprint 35*b*. The reader 35 may include a Face ID 35*c*. In some cases, the access control application 32 may be configured to use either one-step or two-step verification based on the user's preconfigured privileges and access levels saved on the mobile device 28. In one-step verification, the access control application 32 will grant access directly when the Door ID matches preconfigured data for the door.

In two-step verification, the access control application 32 will grant access when the Door ID matches the preconfigured data for the door and the user verifies his credentials using the reader 34. As an example, the user may verify their credentials by entering a PIN code that matches the PIN code 35*a*. As another example, the user may verify their credentials using biometric data such as a fingerprint that matches the fingerprint 35*b* or by providing a face ID that matches the Face ID 35*c*.

During a creation process for creating the mobile credentials for a particular user, the system administrator may assign suitable credentials for that user. This may include the parameters useful in performing two-step verification as well as device-specific information such as mobile device specifications and OS (operating system) versions. A regular user can get their credentials via two-step verification using a PIN code. Another user having higher security permissions may obtain their credentials via two-step verification using either fingerprint or Face ID verifications. Other users may obtain their credentials with any combination of PIN and/or fingerprint and/or Face ID. Other processes are also contemplated.

Figure 2A:
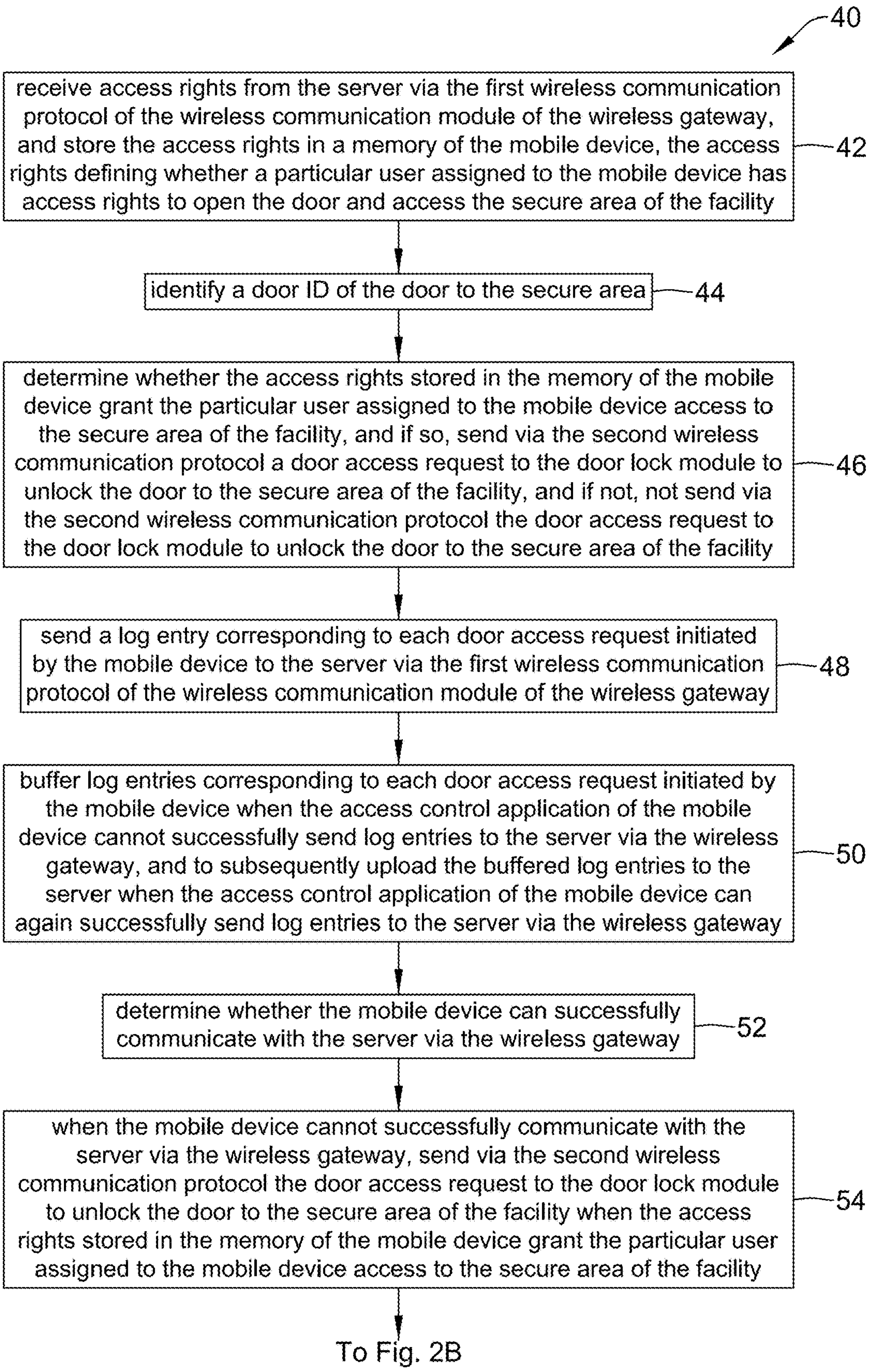
FIGS. 2A, 2B and 2C are flow diagrams that together show an illustrative series of steps that an access control application running on a mobile device as part of the illustrative system of FIG. 1 may be configured to carry out.
Figure 2B:
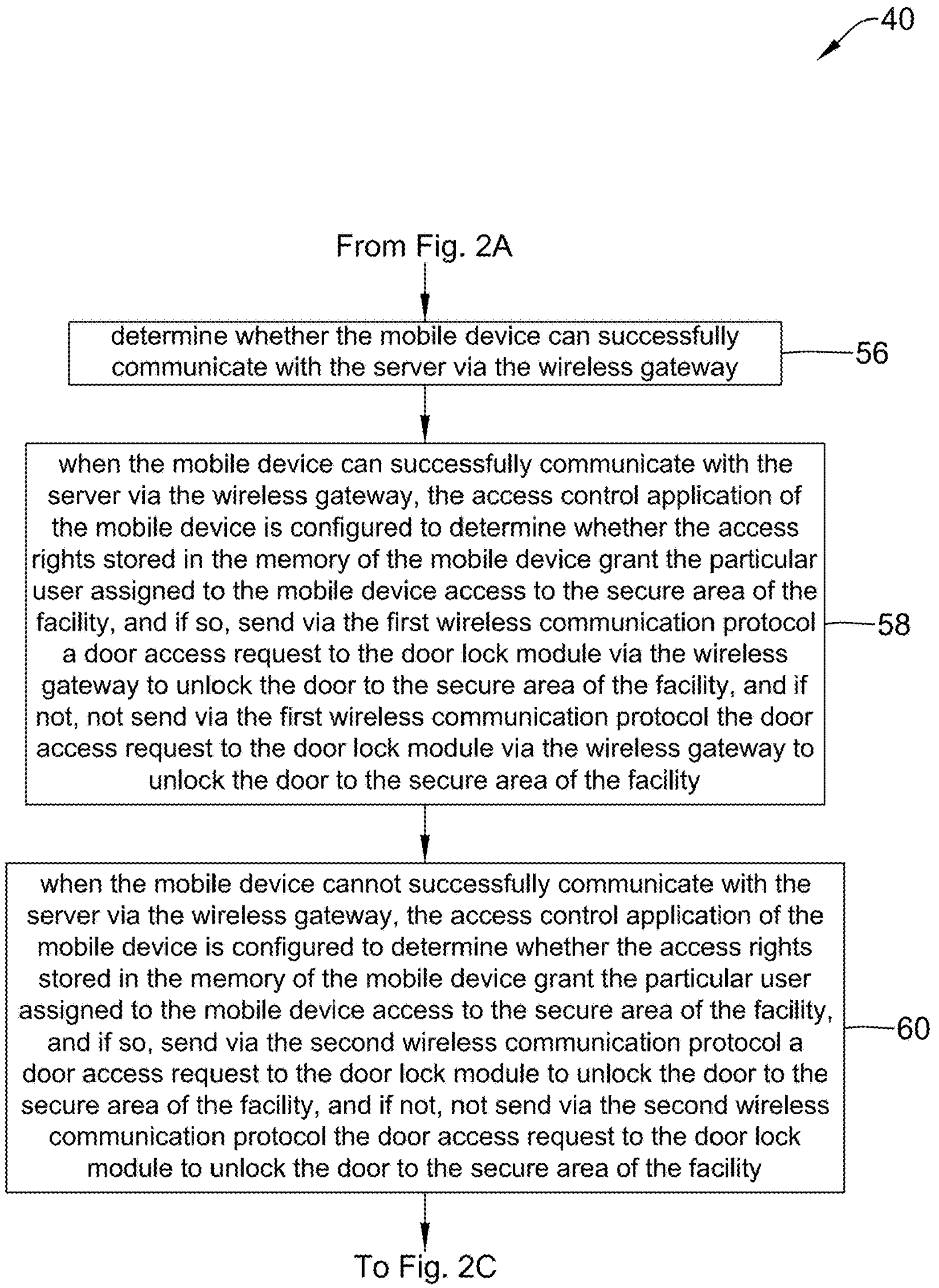
Figure 2C:
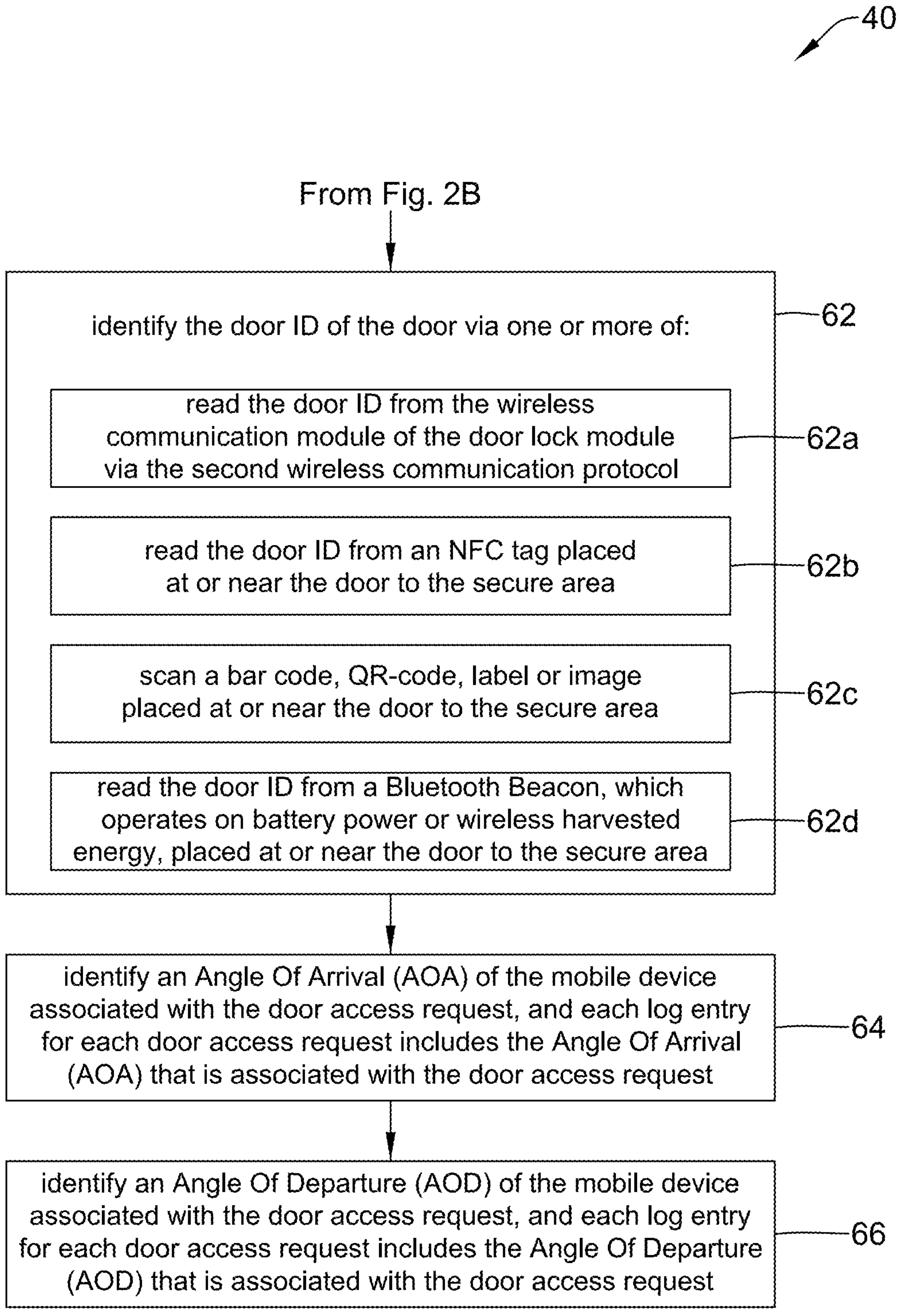

The access control application 32 of the mobile device 28 may be configured to carry out a number of steps related to access control. FIGS. 2A, 2B and 2C are flow diagrams that together show an illustrative series of steps 40 that the access control application 32 may be configured to carry out. The access control application 32 may be configured to receive access rights from the server 18 via the first wireless communication protocol of the wireless communication module 26 of the wireless gateway 22, and store the access rights in the memory 34 of the mobile device 28, the access rights defining whether a particular user assigned to the mobile device 28 has access rights to open the door 14 and access the secure area of the facility, as indicated at block 42. The access control application 32 may be configured to identify a door ID of the door 14 to the secure area, as indicated at block 44. The access control application 32 may be configured to determine whether the access rights stored in the memory 34 of the mobile device 28 grant the particular user assigned to the mobile device 28 access to the secure area of the facility, and if so, send via the second wireless communication protocol a door access request to the door lock module 12 to unlock the door 14 to the secure area of the facility, and if not, not send via the second wireless communication protocol the door access request to the door lock module 12 to unlock the door 14 to the secure area of the facility, as indicated at block 46. The access control application 32 may be configured to send a log entry corresponding to each door access request initiated by the mobile device to the server via the first wireless communication protocol of the wireless communication module 26 of the wireless gateway 22, as indicated at block 48. As an example, each log entry for each door access request may include the door ID associated with the door access request, a mobile device identifier (e.g. MAC address or the International Mobile Equipment Identity (IMEI)) of the mobile device associated with the door access request, and a timestamp associated with the door access request.

In some cases, the access control application 32 may be configured to buffer log entries corresponding to each door access request initiated by the mobile device 28 when the access control application 32 of the mobile device 28 cannot successfully send log entries to the server 18 via the wireless gateway 22, and to subsequently upload the buffered log entries to the server 18 when the access control application 32 of the mobile device 28 can again successfully send log entries to the server 18 via the wireless gateway 22, as indicated at block 50. The access control application 32 may be configured to determine whether the mobile device 28 can successfully communicate with the server 18 via the wireless gateway 22, as indicated at block 52, and when the mobile device 28 cannot successfully communicate with the server 18 via the wireless gateway 22, send via the second wireless communication protocol the door access request to the door lock module 12 to unlock the door 14 to the secure area of the facility when the access rights 36 stored in the memory 34 of the mobile device 28 grant the particular user assigned to the mobile device 28 access to the secure area of the facility, as indicated at block 54.

In some cases, and continuing on FIG. 2B, the access control application 32 may be configured to determine whether the mobile device 28 can successfully communicate with the server 18 via the wireless gateway 22, as indicated at block 56, and when the mobile device 28 can successfully communicate with the server 18 via the wireless gateway 22, the access control application 32 of the mobile device 28 is configured to determine whether the access rights 36 stored in the memory 34 of the mobile device 28 grant the particular user assigned to the mobile device 28 access to the secure area of the facility, and if so, send via the first wireless communication protocol a door access request to the door lock module 12 via the wireless gateway 22 (and sometimes the server 18) to unlock the door 14 to the secure area of the facility, and if not, not send via the first wireless communication protocol the door access request to the door lock module 12 via the wireless gateway 22 to unlock the door 14 to the secure area of the facility, as indicated at block 58. When the mobile device 28 cannot successfully communicate with the server 18 via the wireless gateway 22, the access control application 32 may be configured to determine whether the access rights 36 stored in the memory 34 of the mobile device 28 grant the particular user assigned to the mobile device 28 access to the secure area of the facility, and if so, send via the second wireless communication protocol a door access request to the door lock module 12 to unlock the door 14 to the secure area of the facility, and if not, not send via the second wireless communication protocol the door access request to the door lock module 12 to unlock the door 14 to the secure area of the facility, as indicated at block 60.

In some cases, and continuing on FIG. 2C, the access control application 32 may be configured to identify the door ID of the door 14, as indicated at block 62. The access control application 32 may be configured to identify the door ID of the door 14 by reading the door ID from the wireless communication module of the door lock module 12 via the second wireless communication protocol, as indicated at block 62*a*. The access control application 32 may be configured to identify the door ID of the door 14 by reading the door ID from an NFC tag placed at or near the door 14 to the secure area, as indicated at block 62*b*. The access control application 32 may be configured to identify the door ID of the door 14 by scanning a bar code, a QR-code, a label or an image placed at or near the door 14 to the secure area, as indicated at block 62*c*. The access control application 32 may be configured to identify the door ID of the door 14 by reading the door IO from a Bluetooth beacon, which operates on battery power or wireless harvested energy, placed at or near the door 14 to the secure area, as indicated at block 62*d*.

In some cases, the access control application 32 may be configured to identify an Angle Of Arrival (AOA) of the mobile device 28 associated with the door access request and to include the Angle Of Arrival (AOA) that is associated with the door access request in the corresponding log entry, as indicated at block 64. The AOA describes the relative angle with which the person carrying the mobile device 28 approached the door 14. For example, the person carrying the mobile device 28 may have approached the door 14 from a first side of the door (e.g. entry into the secure area), or perhaps may have approached the door 14 from the other side of the door 14 (e.g. exiting the secure area). In some cases, the access control application 32 may be configured to identify an Angle Of Departure (AOD) of the mobile device 28 associated with the door access request and to include the Angle Of Departure (AOD) that is associated with the door access request in the corresponding log entry, as indicated at block 66. The AOD describes the relative direction at which the person carrying the mobile device 28 exited the door 14. The AOA and/or or AOD may be used to keep an accurate count of the number of people that are currently in the secure area.

In some cases, the access control application 32 of the mobile device 28 may default to sending via the second wireless communication protocol a door access request to the door lock module to unlock the door to the secure area of the facility. In other cases, the access control application 32 of the mobile device 28 may default to sending via the first wireless communication protocol a door access request to the wireless gateway 22 (and sometimes on to the server 18) to unlock the door to the secure area of the facility. In some cases, the access control application 32 of the mobile device 28 may be configured to determine whether the mobile device 28 can successfully communicate with the server 18 via the wireless gateway 22.

When the mobile device 28 can successfully communicate with the server 18 via the wireless gateway 22, the access control application 32 of the mobile device 28 may determine whether the access rights 36 stored in the memory 34 of the mobile device 28 grant the particular user assigned to the mobile device 28 access to the secure area of the facility, and if so, send via the first wireless communication protocol a door access request to the door lock module 12 via the wireless gateway 22 (and sometimes the server 18) to unlock the door 14 to the secure area of the facility, and if not, not send via the first wireless communication protocol the door access request to the door lock module 12 via the wireless gateway 22 (and sometimes the server 18) to unlock the door 14 to the secure area of the facility. Alternatively, the access control application 32 of the mobile device 28 may send via the first wireless communication protocol a door access request to the server 18 via the wireless gateway 22, and the server 18 may determine whether the particular user assigned to the mobile device 28 has access rights to access the secure area of the facility, and if so, the server 18 may send a door access request to the wireless gateway 22, which then transmits the door access request to the door lock module 12 via the first wireless communication protocol to open the door 14. Alternatively, the access control application 32 of the mobile device 28 may send via the first wireless communication protocol a door access request to the wireless gateway 22, and the wireless gateway 22 may determine whether the particular user assigned to the mobile device 28 has access rights to access the secure area of the facility, and if so, the wireless gateway 22 may send a door access request to the door lock module 12 via the first wireless communication protocol to unlock the door 14.

When the mobile device 28 cannot successfully communicate with the server 18 via the wireless gateway 22, the access control application 32 of the mobile device 28 may be configured to determine whether the access rights 36 stored in the memory 34 of the mobile device 28 grant the particular user assigned to the mobile device 28 access to the secure area of the facility, and if so, send via the second wireless communication protocol a door access request to the door lock module 12 to unlock the door 14 to the secure area of the facility, and if not, not send via the second wireless communication protocol the door access request to the door lock module 12 to unlock the door 14 to the secure area of the facility. The access control application 32 of the mobile device 28 may buffer log entries corresponding to each door access request initiated by the mobile device 28 when the access control application 32 of the mobile device 28 cannot successfully send log entries to the server 18 via the wireless gateway 22, and then subsequently upload the buffered log entries to the server 18 when the access control application 32 of the mobile device 28 can again successfully send log entries to the server 18 via the wireless gateway 22.

Figure 3A:
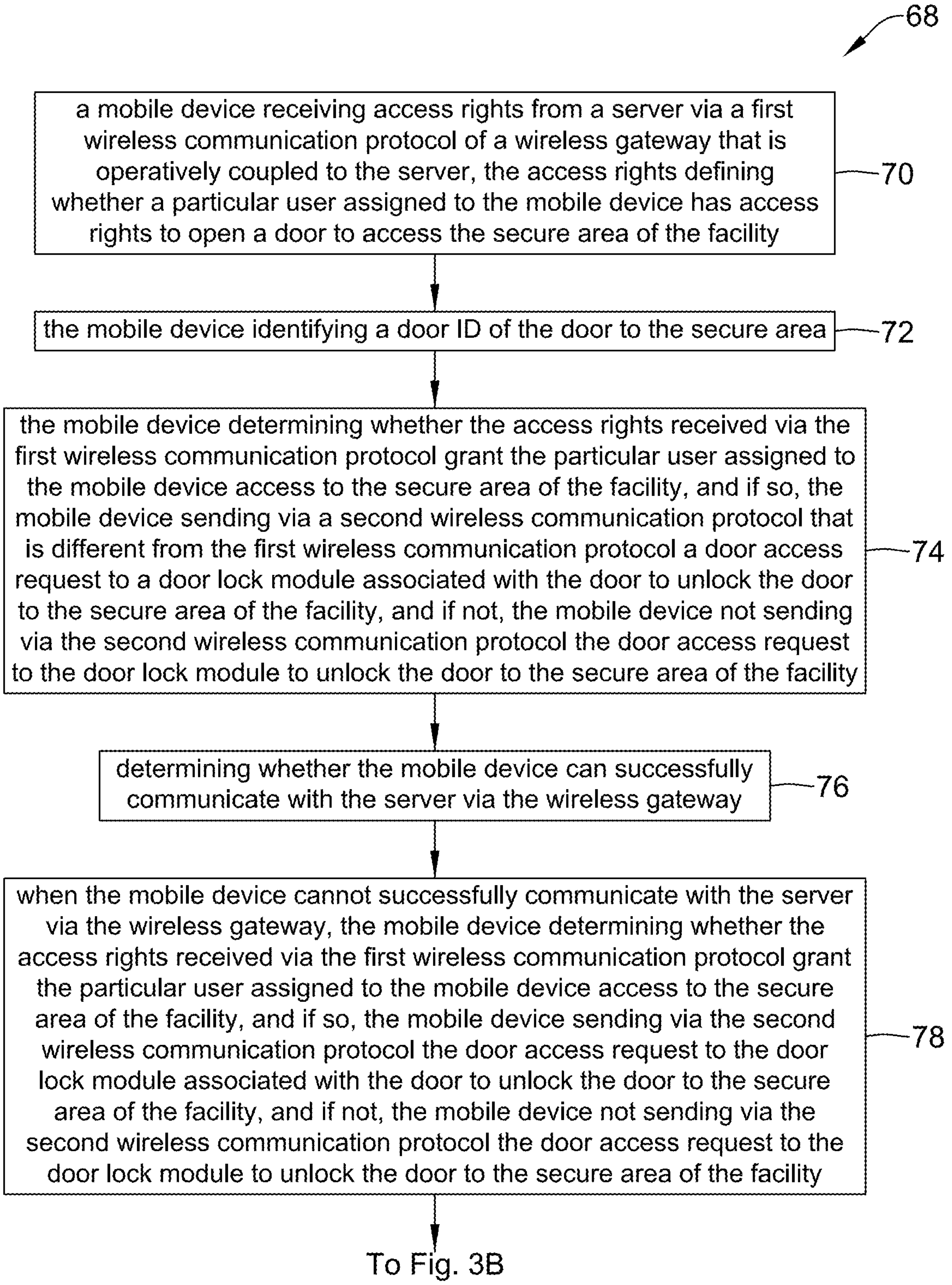
FIGS. 3A and 3B are flow diagrams that together show an illustrative method for controlling access to a secure area within a facility.
Figure 3B:
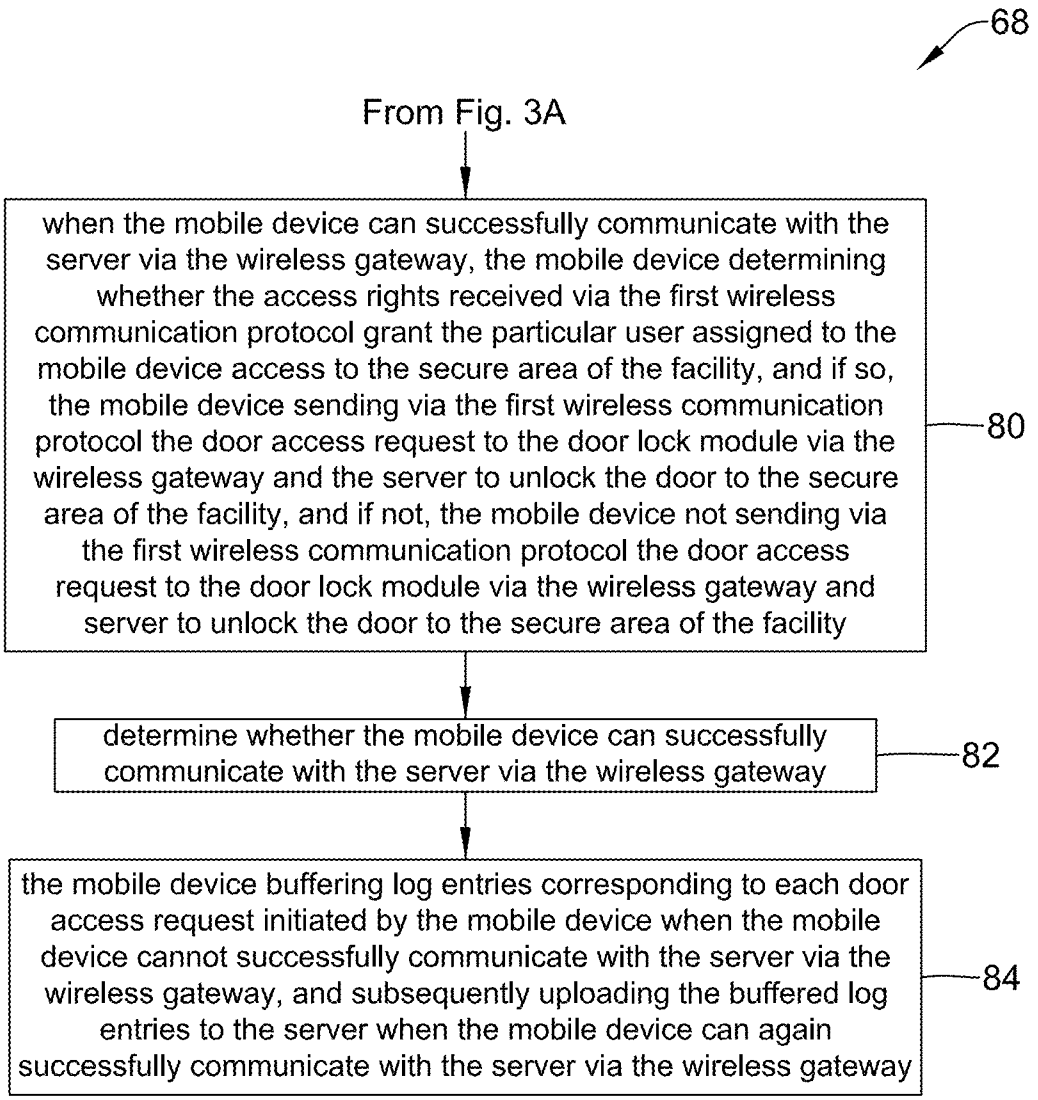

FIGS. 3A and 3B are flow diagrams that together show an illustrative method 68 for controlling access to a secure area of a facility. The method 68 includes a mobile device (such as the mobile device 28) receiving access rights (such as the access rights 36) from a server (such as the server 18) via a first wireless communication protocol of a wireless gateway (such as the wireless gateway 22) that is operatively coupled to the server, the access rights defining whether a particular user assigned to the mobile device has access rights to open a door to access the secure area of the facility, as indicated at block 70. The mobile device identifies a door ID of the door (such as the door 14) to the secure area, as indicated at block 72. The mobile device determines whether the access rights received via the first wireless communication protocol grant the particular user assigned to the mobile device access to the secure area of the facility, and if so, the mobile device sending via a second wireless communication protocol that is different from the first wireless communication protocol a door access request to a door lock module (such as the door lock module 12) associated with the door to unlock the door to the secure area of the facility, and if not, the mobile device not sending via the second wireless communication protocol the door access request to the door lock module to unlock the door to the secure area of the facility, as indicated at block 74.

In some cases, the method 68 may include determining whether the mobile device can successfully communicate with the server via the wireless gateway, as indicated at block 76. When the mobile device cannot successfully communicate with the server via the wireless gateway, the mobile device determines whether the access rights received via the first wireless communication protocol grant the particular user assigned to the mobile device access to the secure area of the facility, and if so, the mobile device sending via the second wireless communication protocol the door access request to the door lock module associated with the door to unlock the door to the secure area of the facility, and if not, the mobile device not sending via the second wireless communication protocol the door access request to the door lock module to unlock the door to the secure area of the facility, as indicated at block 78.

Continuing on FIG. 3B, when the mobile device can successfully communicate with the server via the wireless gateway, the mobile device sending via the first wireless communication protocol the door access request to the door lock module via the wireless gateway and sometimes the server to unlock the door to the secure area of the facility, and if not, the mobile device not sending via the first wireless communication protocol the door access request to the door lock module via the wireless gateway and server to unlock the door to the secure area of the facility, as indicated at block 80. In some cases, the mobile device, the wireless gateway and/or the server determine whether the access rights grant the particular user assigned to the mobile device access to the secure area of the facility before sending the door access request to the door lock module. The mobile device may send a log entry corresponding to each door access request initiated by the mobile device to the server via the first wireless communication protocol of the wireless gateway, as indicated at block 82. In some cases, the method 68 may further include the mobile device buffering log entries corresponding to each door access request initiated by the mobile device when the mobile device cannot successfully communicate with the server via the wireless gateway, and subsequently uploading the buffered log entries to the server when the mobile device can again successfully communicate with the server via the wireless gateway, as indicated at block 84.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A system for controlling access to a secure area of a facility, the system comprising:
- a door lock module for locking and unlocking a door to the secure area of the facility, the door lock module including a wireless communication module that support a first wireless communication protocol and a second wireless communication protocol;
- a mobile device running an access control application, the mobile device including a wireless communication module that support the first wireless communication protocol and the second wireless communication protocol;
- a server;
- a wireless gateway situated in the facility, the wireless gateway including a wireless communication module supporting the first wireless communication protocol, the wireless gateway configured to independently communicate with the door lock module and the mobile device via the first wireless communication protocol, the wireless gateway operatively coupled to the server;

the access control application of the mobile device is configured to:

determine whether the mobile device can successfully communicate with the server via the wireless gateway;

receive access rights from the server via the first wireless communication protocol of the wireless communication module of the wireless gateway, and store the access rights in a memory of the mobile device, the access rights defining whether a particular user assigned to the mobile device has access rights to open the door and access the secure area of the facility;

identify a door ID of the door to the secure area;

when the mobile device can successfully communicate with the server via the wireless gateway, determine whether the access rights stored in the memory of the mobile device grant the particular user assigned to the mobile device access to the secure area of the facility, and if so, send via the first wireless communication protocol a door access request to the door lock module to unlock the door to the secure area of the facility, and if not, not send via the first wireless communication protocol the door access request to the door lock module to unlock the door to the secure area of the facility;

when the mobile device cannot successfully communicate with the server via the wireless gateway, the access control application of the mobile device is configured to determine whether the access rights stored in the memory of the mobile device grant the particular user assigned to the mobile device access to the secure area of the facility, and if so, send via the second wireless communication protocol a door access request to the door lock module to unlock the door to the secure area of the facility, and if not, not send via the second wireless communication protocol the door access request to the door lock module to unlock the door to the secure area of the facility; and send a log entry corresponding to each door access request initiated by the mobile device to the server via the first wireless communication protocol of the wireless communication module of the wireless gateway.

2. The system of claim 1, wherein the access control application of the mobile device is configured to buffer log entries corresponding to each door access request initiated by the mobile device when the access control application of the mobile device cannot successfully send log entries to the server via the wireless gateway, and to subsequently upload the buffered log entries to the server when the access control application of the mobile device can again successfully send log entries to the server via the wireless gateway.

3. The system of claim 1, wherein the access control application of the mobile device is configured to:

determine whether the mobile device can successfully communicate with the server via the wireless gateway; and when the mobile device cannot successfully communicate with the server via the wireless gateway, send via the second wireless communication protocol the door access request to the door lock module to unlock the door to the secure area of the facility when the access rights stored in the memory of the mobile device grant the particular user assigned to the mobile device access to the secure area of the facility.

4. The system of claim 1, wherein the server is configured to receive a door access request to unlock the door, and in response, send an unlock command to the door lock module of the door via the first wireless communication protocol of the wireless communication module of the wireless gateway to unlock the door to the secure area of the facility.

5. The system of claim 4, wherein the server is configured to receive the door access request to unlock the door from one or more of:

the wireless gateway, which receives the door access request from the mobile device via the first wireless communication protocol of the wireless communication module of the wireless gateway; and an operator console that is operatively coupled to the server.

6. The system of claim 1, wherein the first wireless communication protocol is one of WIFI, Bluetooth and Zigbee, and the second wireless communication protocol a different one of WIFI, Bluetooth and Zigbee.

7. The system of claim 6, wherein the first wireless communication protocol is WIFI, and the second wireless communication protocol is Bluetooth.

8. The system of claim 1, wherein the wireless gateway is operatively coupled to the server via a network that includes the Internet.

9. The system of claim 1, wherein the access control application of the mobile device is configured to identify the door ID of the door via one or more of:

read the door ID from the wireless communication module of the door lock module via the second wireless communication protocol;

read the door ID from an NFC tag placed at or near the door to the secure area; and scan a bar code placed at or near the door to the secure area.

10. The system of claim 1, wherein each log entry for each door access request includes the door ID associated with the door access request, a mobile device identifier of the mobile device associated with the door access request, and a timestamp associated with the door access request.

11. The system of claim 10, wherein access control application of the mobile device is configured to:

identify an Angle Of Arrival (AOA) of the mobile device associated with the door access request; and wherein each log entry for each door access request includes the Angle Of Arrival (AOA) that is associated with the door access request.

12. The system of claim 10, wherein access control application of the mobile device is configured to:

identify an Angle Of Departure (AOD) of the mobile device associated with the door access request; and wherein each log entry for each door access request includes the Angle Of Departure (AOD) that is associated with the door access request.

13. A method for controlling access to a secure area of a facility, the method comprising:

determining, by a mobile device, whether the mobile device can successfully communicate with the server via the wireless gateway;

receiving, by the mobile device, access rights from a server via a first wireless communication protocol of a wireless gateway that is operatively coupled to the server, the access rights defining whether a particular user assigned to the mobile device has access rights to open a door to access the secure area of the facility;

when the mobile device cannot successfully communicate with the server via the wireless gateway, the mobile device determining whether the access rights received via the first wireless communication protocol grant the particular user assigned to the mobile device access to the secure area of the facility, and if so, the mobile device sending via a second wireless communication protocol the door access request to a door lock module associated with a door to unlock the door to the secure area of the facility, and if not, the mobile device not sending via the second wireless communication protocol the door access request to the door lock module to unlock the door to the secure area of the facility;

the mobile device identifying a door ID of the door to the secure area; and when the mobile device can successfully communicate with the server via the wireless gateway, the mobile device determining whether the access rights received via the first wireless communication protocol grant the particular user assigned to the mobile device access to the secure area of the facility, and if so, the mobile device sending via the first wireless communication protocol that is different from the second wireless communication protocol a door access request to the door lock module associated with the door to unlock the door to the secure area of the facility, and if not, the mobile device not sending via the first wireless communication protocol the door access request to the door lock module to unlock the door to the secure area of the facility.

14. The method of claim 13, comprising the mobile device sending a log entry corresponding to each door access request initiated by the mobile device to the server via the first wireless communication protocol of the wireless gateway.

15. The method of claim 14, comprising the mobile device buffering log entries corresponding to each door access request initiated by the mobile device when the mobile device cannot successfully communicate with the server via the wireless gateway, and subsequently uploading the buffered log entries to the server when the mobile device can again successfully communicate with the server via the wireless gateway.

16. A non-transitory computer readable medium storing instructions thereof that when executed by one or more processors of a mobile device causes the one or more processors of the mobile device to:

determine whether the mobile device can successfully communicate with a server via a wireless gateway;

receive access rights from a server via a first wireless communication protocol of a wireless gateway that is operatively coupled to the server, the access rights defining whether a particular user assigned to the mobile device has access rights to open a door to access the secure area of the facility;

when the mobile device cannot successfully communicate with the server via the wireless gateway, determine whether the access rights received via the first wireless communication protocol grant the particular user assigned to the mobile device access to the secure area of the facility, and if so, send via a second wireless communication protocol the door access request to the door lock module associated with the door to unlock the door to the secure area of the facility, and if not, send via the second wireless communication protocol the door access request to the door lock module to unlock the door to the secure area of the facility;

identify a door ID of the door to the secure area; and when the mobile device can successfully communicate with the server via the wireless gateway, determine whether the access rights received via the first wireless communication protocol grant the particular user assigned to the mobile device access to the secure area of the facility, and if so, send via the first wireless communication protocol that is different from the second wireless communication protocol the door access request to the door lock module associated with the door via the wireless gateway and the server to unlock the door to the secure area of the facility, and if not, not send via the first wireless communication protocol the door access request to the door lock module via the wireless gateway and server to unlock the door to the secure area of the facility.

17. The non-transitory computer readable medium of claim 16, wherein the instructions cause the one or more processors of the mobile device to:

send a log entry corresponding to each door access request initiated by the mobile device to the server via the first wireless communication protocol of the wireless gateway.

* * * * *